United States Patent [19]
Ritchart

[11] Patent Number: 5,792,952
[45] Date of Patent: Aug. 11, 1998

[54] FLUID THERMAL MASS FLOW SENSOR

[75] Inventor: Thomas R. Ritchart, Tracy, Calif.

[73] Assignee: Varian Associates, Inc., Palo Alto, Calif.

[21] Appl. No.: 652,868

[22] Filed: May 23, 1996

[51] Int. Cl.[6] .................................................. G01F 1/68
[52] U.S. Cl. ...................................................... 73/204.27
[58] Field of Search ............................ 73/202, 204.12, 73/204.22, 202.5, 204.27

[56] References Cited

U.S. PATENT DOCUMENTS

| | | | |
|---|---|---|---|
| 1,222,492 | 4/1917 | Thomas. | |
| 1,261,086 | 4/1918 | Wilson et al. | |
| 2,067,645 | 1/1937 | Pinkerton | 73/190 |
| 2,729,976 | 1/1956 | Laub | 73/204 |
| 3,181,357 | 5/1965 | Benson | 73/204 |
| 3,229,522 | 1/1966 | Benson | 73/204 |
| 3,938,384 | 2/1976 | Blair | 73/204 |
| 4,056,975 | 11/1977 | LeMay | 73/202 |
| 4,433,575 | 2/1984 | Rutherford | 73/202 |
| 4,440,021 | 4/1984 | Abouchar et al. | 73/204 |
| 4,464,932 | 8/1984 | Ewing et al. | 73/204 |
| 4,487,062 | 12/1984 | Olin et al. | 73/202 |
| 4,517,838 | 5/1985 | Wachi et al. | 73/204 |
| 4,519,246 | 5/1985 | Hartemink | 73/204 |
| 4,548,075 | 10/1985 | Mariano | 73/202 |
| 4,616,505 | 10/1986 | Jouwsma | 73/204 |
| 4,672,997 | 6/1987 | Landis et al. | 73/202.5 |
| 4,686,856 | 8/1987 | Vavra et al. | 73/204 |
| 4,815,280 | 3/1989 | Tujimura et al. | 73/204.12 |
| 4,829,818 | 5/1989 | Bohrer | 73/204.22 |
| 4,921,005 | 5/1990 | Ohmi et al. | 137/486 |
| 4,984,460 | 1/1991 | Isoda | 73/204.15 |
| 5,191,793 | 3/1993 | Drexel et al. | 73/204.22 |
| 5,279,154 | 1/1994 | Vavra et al. | 73/202.5 |
| 5,280,264 | 1/1994 | Yajima et al. | 338/25 |
| 5,309,762 | 5/1994 | Satoh et al. | 73/204.22 |
| 5,337,604 | 8/1994 | Van Bavel et al. | 73/204.22 |
| 5,373,737 | 12/1994 | Hwang | 73/204.22 |
| 5,398,549 | 3/1995 | Suzuki | 73/204.26 |
| 5,410,912 | 5/1995 | Suzuki | 73/204.15 |
| 5,461,913 | 10/1995 | Hinkle et al. | 73/204.25 |

OTHER PUBLICATIONS

Tison, S.A.; *A Critical Evaluation of Thermal Mass Flow Meters*, National Institute of Standards and Technology, pp. 1–38.

Hinkle, L.D., et al., *Toward understanding the fundamental mechanisms and properties of the thermal mass flow controller*, J.Vac. Sci. Technol. A 9 (3) (American Vacuum Society), pp. 2043–2047.

Rutherford, Ralph E.; *Gas Flow Control With Thermal Mass Flow Measurement*, Measurements & Control, pp. 132–136.

Olin, J.G.; *Process Gas Mass Flow Controllers: An Overview*, Solid State Technology, pp. 58–60.

Ginesi, Donald, et al.; *Full–Bore Flowmeters*, Chemical Engineering, pp. 103–118.

Sullivan, John J.; *Flow Measurement and Control in Vacuum Systems for Microelectronics Processing*, Solid State Technology, pp. 113–118.

Baker, William C., et al.; *The Measurement of Gas Flow Part II*, Journal of the Air Pollution Control Association, pp. 156–162.

Baker, William C., et al.; *The Measurement of Gas Flow Part I*, Journal of the Air Pollution Control Association, pp. 66–72.

Widmer, A.E., et al. *A calibration system for calorimetric mass flow devices*, The Institute of Physics, pp. 213–220.

(List continued on next page.)

*Primary Examiner*—George M. Dombroske
*Assistant Examiner*—Jewel Thompson
*Attorney, Agent, or Firm*—Hunter Auyang

[57] ABSTRACT

A fluid thermal mass flow meter including a composite flow tube having four tubular segments of high thermal conductivity formed in a length of tube made of a material having a relatively low thermal conductivity, a thin film element formed on the surface of and extending around each of the four tubular segments, circuitry for incorporating the elements into a bridge circuit, and a housing for containing the flow tube, elements, and circuitry.

24 Claims, 5 Drawing Sheets

OTHER PUBLICATIONS

LeMay, Dan B.; *A practical guide to gas flow control*, Instruments & Control Systems, pp. 73–77.

Lomas, D.J.; *Selective the Right Flowmeter, Part II: Comparing candidates*, Instrumentation Technology, pp. 71–77.

Lomas, D.J.; *Selecting the Right Flowmeter, Part I: The six favorites*, Instrumentation Technology, pp. 55–62.

Benson, James M., et al.; *Thermal Mass Flowmeter*, Instruments and Control Systems, pp. 85–87.

Laub, J.H.; *Measuring Mass Flow with the boundary–layer flowmeter*, Control Engineering, pp. 112–117.

Laub, J.H.; *An Electric Flow Meter*, Electrical Engineering, pp. 1216–1219.

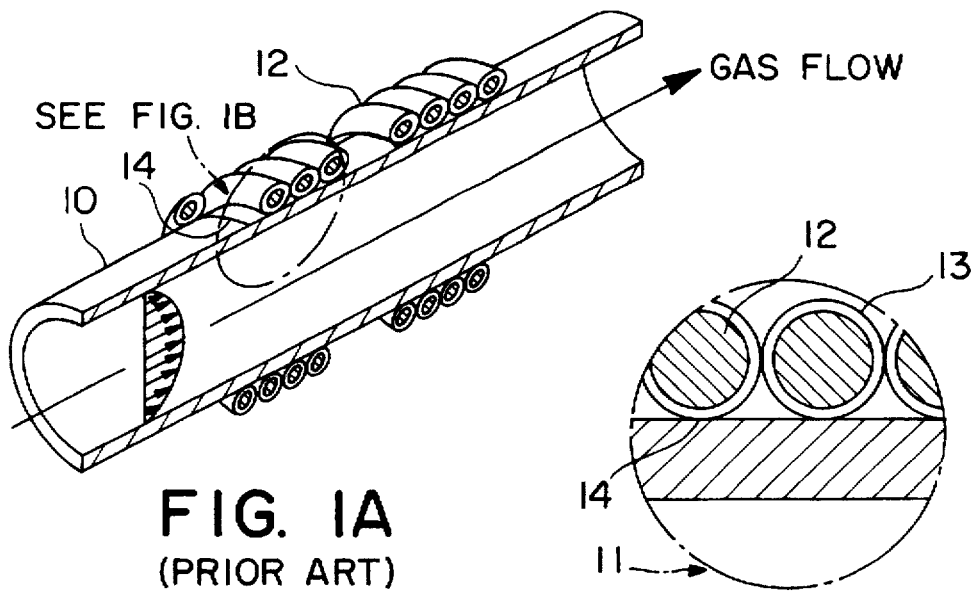
FIG. 1A
(PRIOR ART)
FIG. 1B
(PRIOR ART)
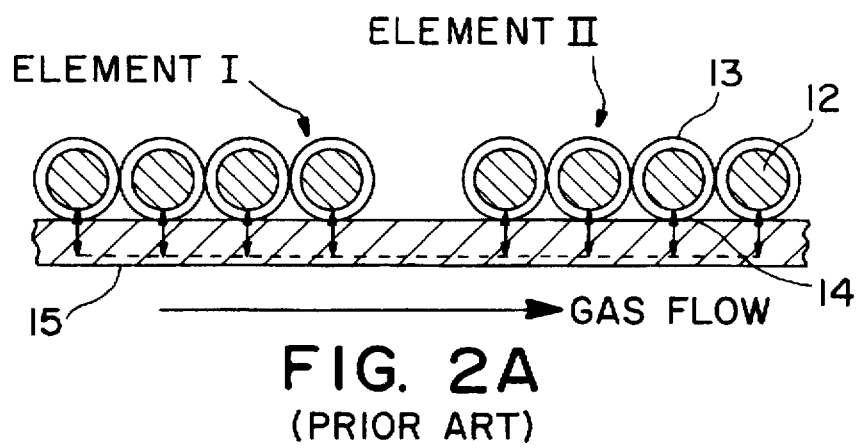
FIG. 2A
(PRIOR ART)
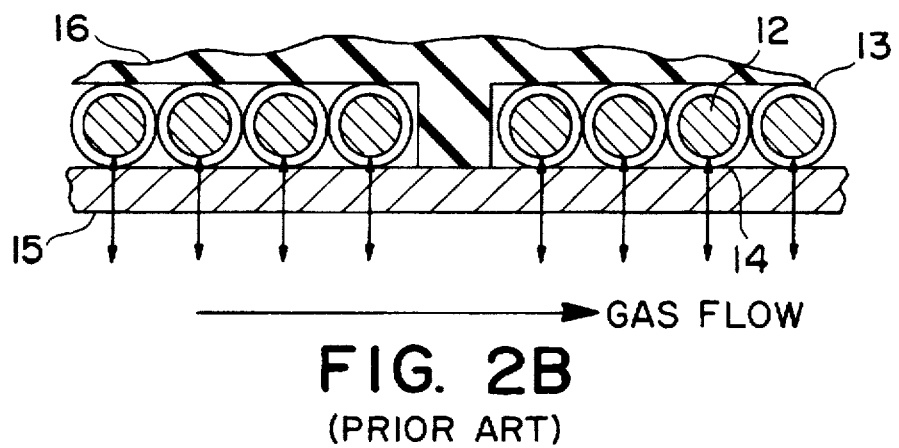
FIG. 2B
(PRIOR ART)

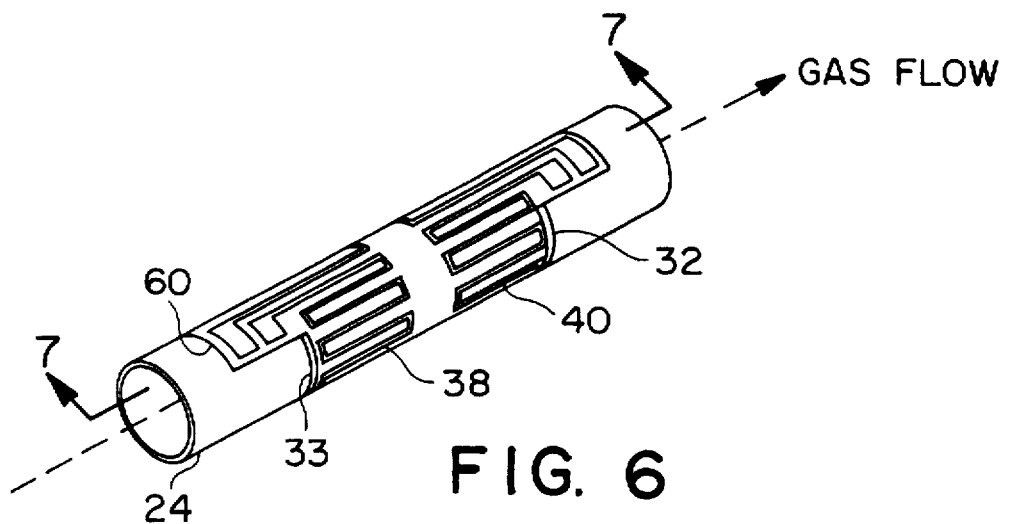
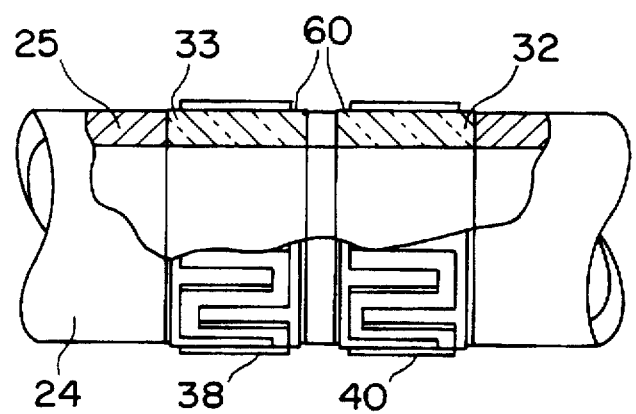

FLUID THERMAL MASS FLOW SENSOR

BACKGROUND OF THE INVENTION

1. Field of the Invention

The present invention relates generally to mass flow measuring systems and more particularly to a capillary tube mass flow measuring system using thin film sensing elements.

2. Brief Description of the Prior Art

Capillary tube thermal mass flow meters have been proposed and manufactured in a wide variety of configurations and have been applied in a wide variety of applications. These meters exploit the fact that heat transfer to fluid flow in a laminar tube from the tube walls is a function of mass flow rate of the fluid, the difference between the fluid temperature and the wall temperature, and the specific heat of the fluid. There are different types of construction used in these meters. One typical construction involves a stainless steel flow tube with two or more wire wound elements on the outside of the tube. The wire is usually very fine and has a high temperature coefficient of resistance. The elements can act as heaters or detectors or both. One or more of the elements is energized with electrical current to supply heat to the fluid stream through the tube. If the heaters are supplied with constant current, fluid mass flow through the tube can be derived from temperature difference in the elements. Fluid mass flow can also be derived by varying the current through the heaters to maintain a constant temperature profile along the tubes. Mass flow is then derived from the power required to maintain this constant temperature profile. Although the typical wire wound construction of these thermal mass flow meters is adequate, it is nevertheless, difficult to produce these meters thereby resulting in a number of disadvantages.

First, the wire is usually so thin that it is difficult to handle and breaks easily. Secondly, the characteristics of each element are not very repeatable, i.e., the resistance of the meters is affected by the variations in the wire diameter, the insulation and the tension. Thirdly, some of the wire leading away from the tube is not in contact with the tube, thereby increasing sensitivity to ambient conditions and increasing thermal lag. Furthermore, over time, the characteristics of a coil can drift. For example, the coil tension can relax or the wire insulator can degrade with thermal cycling. Moreover, the wire does not make good contact with the tube, and there is essentially a line of contact between the wire and the tube. This reduces sensitivity and contributes to slow speed of response. An additional disadvantage of this prior art technique is that the maximum element resistance is physically limited by the number of turns that can be placed on the tube, and by the size of the wire. This serves as a disadvantage namely because higher resistance elements are desired for creating higher signal outputs. Also, due to the difficulty associated with wire winding mentioned above, batch type manufacturing of these meters is not feasible for reasons such as lead-out connections from the end of the resistance wires being difficult to make, and the wire size and insulation making the assembly task very tedious.

Winding details of a prior art wire wound meter is depicted in broken perspective in FIG. 1. Gas to be measured flows through a flow tube 10 about which a length of wire 12 is wound. A closer view of the wire windings illustrated at 11 shows the wire 12 having a coating of electrical insulation 13 around it. As is immediately apparent from the illustration, the "line of contact" 14, i.e., the locus of points at which the outer surface of the insulation surrounding wire 12 engages the outer surface of tube 10, is in fact a very narrow line having a width of only a fraction of the diameter of wire 12. This severely limits the opportunity for heat transfer between tube and wire.

FIGS. 2a and 2b depict yet another disadvantage of this prior art meter construction, in that to prevent heat transfer by conduction via the tube wall from element I to element II, the tube wall 15 must have low thermal conductivity. This is in conflict with the need to have high thermal conductivity to promote the transfer of heat, that is, by conduction via the tube wall between the elements and the gas. To prevent free convection and thus transfer of heat from element to element on the outside of the tube, insulation 16 is placed external to the sensing tube. While insulation 16 reduces the effect of external convection, it is non-repeatable and slows sensor response. A shift in insulation can alter an element's steady state temperature changing its sensitivity to flow.

More improved prior art techniques for constructing these thermal flow meters include the use of thin film sensors on tubes. These thermal flow measuring devices comprise elements positioned on the outer wall of a thermally conductive measuring channel where they are thermally insulated from the environment by an insulating body. The sensor element is heated for creating a temperature gradient as a function of the fluid's flow rate and the temperature gradient is then converted into an electrical measuring signal using a bridge circuit. While prior art thin film techniques have advantages over the wire wound construction of such meters, there are nevertheless some drawbacks with current techniques, one of which is the lack of compensation for changes in ambient temperature where the bridge circuit is concerned. Another disadvantage is difficulty in achieving accurate, repeatable and stable elements that can be trimmed to closely match each other.

SUMMARY OF THE INVENTION

It is therefore a primary objective of the present invention to provide a thermal flow meter capable of being manufactured in large batches.

Another object of the present invention is to provide a thermal flow meter having thermally isolated elements.

Yet another object of the present invention is to provide a flow meter having element reproducibility on each device and from device to device.

It is a further objective of the present invention to provide a flow meter with elements intimately in contact with the flow tube.

A still further object of the present invention is to provide a flow meter having resistive elements that can be easily trimmed and attached to the external circuitry.

Further objects of the present invention are to provide a flow meter design having substantially instantaneous response to changes in flow rate, substantially high sensitivity to changes in flow, substantially no sensitivity to changes in ambient temperature, and substantially no attitude sensitivity.

Briefly, a presently preferred embodiment of the present invention includes a composite flow tube having four tubular segments of high thermal conductivity formed in a length of tube made of a material having a relatively low thermal conductivity, a thin film element formed on the surface of and extending around each of the four tubular segments, circuitry for incorporating the elements into a bridge circuit, and a housing for containing the flow tube, elements, and circuitry.

These and other objects and advantages of the present invention will no doubt become apparent to those skilled in the art after having read the following detailed description of the preferred embodiment which is illustrated in the several figures of the drawing.

IN THE DRAWING

FIG. 1 depicts a partially broken sequence of wire wound tubing typical of that used in a prior art thermal mass flow meter having wire wound elements formed on the outside of a stainless steel flow tube;

FIGS. 2a and 2b are cross sections depicting the tube wall thermal conduction characteristics in the prior art flow meter construction of FIG. 1;

FIG. 6 shows a perspective view of a resistive element pair formed on the surface of tubular segments of a composite sense tube;

FIG. 7 shows a side elevational view of the resistive element pair formed on the surface of tubular segments of the composite sense tube;

DESCRIPTION OF THE PREFERRED EMBODIMENT

Figure 3:
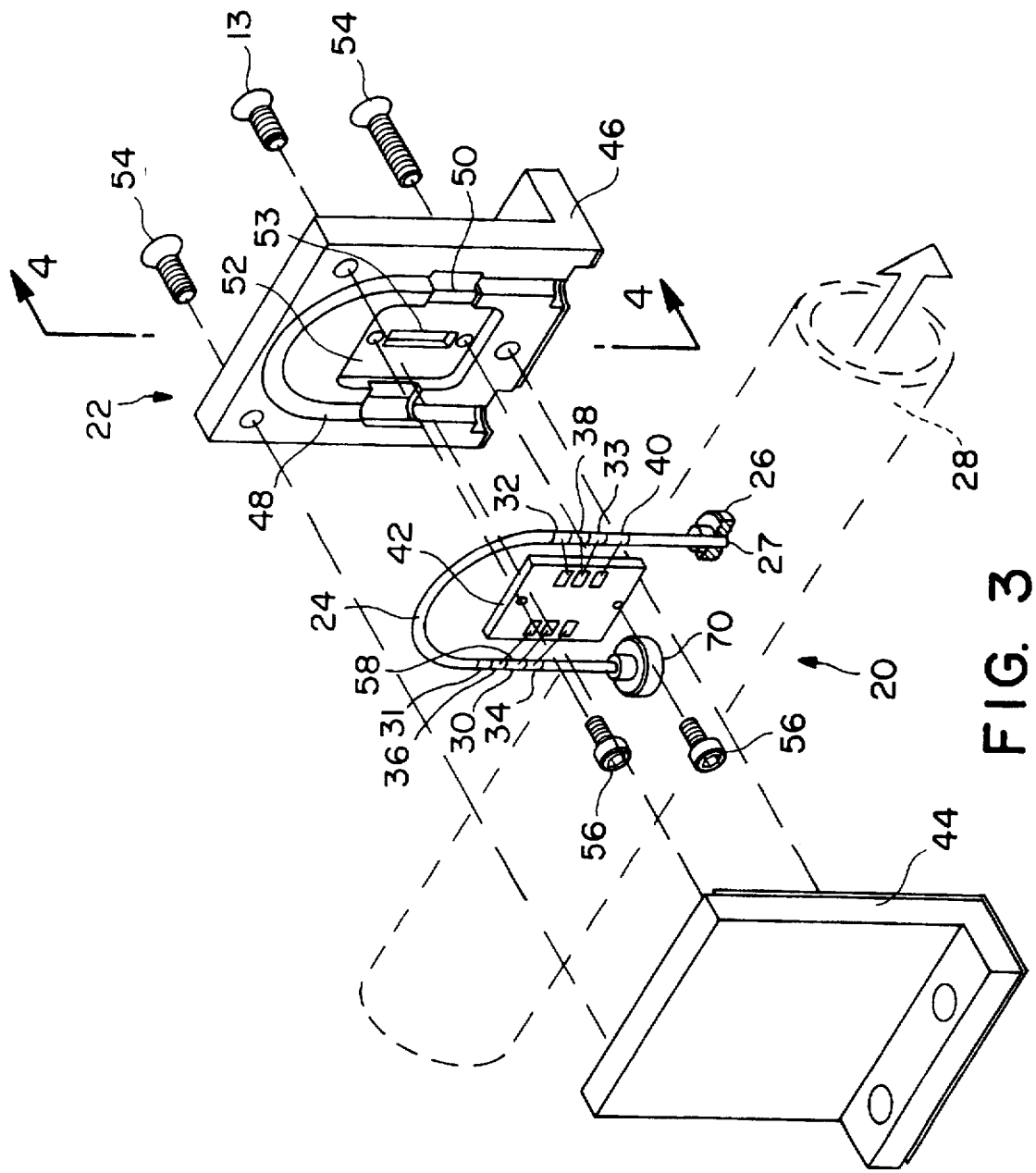
FIG. 3 shows in exploded perspective a preferred embodiment of a flow meter in accordance with the present invention using thin film elements.

Referring now to FIG. 3 of the drawing, a fluid flow meter in accordance with the present invention is shown at 20 with the components of its protective housing 22 pictorially exploded array from their normal positions. The device is comprised of an inverted U-shaped sensor tube 24 with fittings 26 attached to its ends 27 by brazing or welding and for connecting the tube to a fluid source such as the tubular conduit suggested by the dashed lines 28. Sensor tube 24 is shown in a "U" type shape, but can be straight, bowed, looped or of some other geometry. As will be explained below tube 24 is of a composite structure including four tubular segments of higher thermal conductivity than the remainder of the tube. Resistive elements 34, 36, 38, 40 respectively formed around the segments 30-33 are shown and described in more detail below. The elements are connected to a printed circuit board 42 via wire leads 58 which as depicted are stainless steel lead wires, but could also be a flexible circuit as described later.

For encasing sensor tube 24 and circuit board 42 two aluminum housing parts 44 and 46 are provided. Parts 44 and 46 have matching semi-cylindrical channels 48 formed therein adapted to form a chamber for receiving and intimately housing tube 24. In addition relief pockets 50 are formed in each of housing 44 and 46 for providing separations from the tube in the areas including elements 34-40. Furthermore, a generally rectangular recess 52 is also formed in each part 44 and 46 and adapted to receive and house circuit board 42. An opening 53 accommodates external electrical connection to PC board 42. The housing assembly is held together securely with screws 54, while printed circuit board 42 is fastened to housing 22 using socket head screws 56.

The circuit traces (not shown) of PC board 42 are connected to the four elements 34-40 via lead wires 58 to form a Wheatstone bridge configuration of a type known to those of ordinary skill in the art. Constant current is supplied to the bridge from an external current source (not shown). The elements 34-40 formed on the sensor tube 24 are resistive and have a high temperature coefficient of resistance, and are accordingly heated by current supplied from the external current source, as will be discussed in more detail below.

When there is no fluid flow through sense tube 24, all of the elements 34-40 are at the same temperature and thus have the same resistance. The bridge output is thus zero. When fluid flows in the tube, heat is differentially removed from the elements giving rise to a temperature gradient along the portions of the tube covered by the elements 34-40. As a consequence, an unbalance is created in the bridge circuit resulting in the generation of a signal that is proportional to the fluid mass flow rate.

Figure 4:
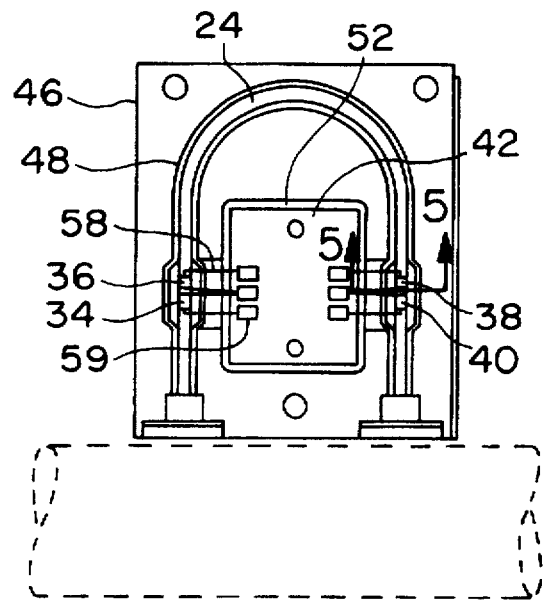
FIG. 4 shows an elevational view of the flow meter taken generally along the line 4—4 of FIG. 3.

FIG. 4 is an elevational view looking in the direction of arrows 4—4 in FIG. 3 and showing the tube 24 received within the channel 48. PC board 42 is also shown disposed within the recess 52 with the pads 59 thereof connected to the tube carried elements 34-40 by conductors 58. Conductive traces found on the opposite side of board 42 are connected to a suitable connector extending out of the housing via opening 53 (FIG. 3).

Figure 5:
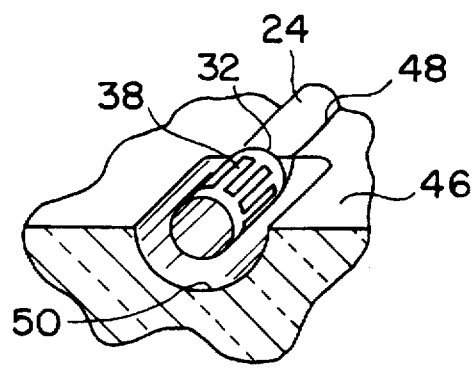
FIG. 5 shows a broken sectional view of the flow meter taken generally along the line 5—5 of FIG. 4.

FIG. 5 is a broken sectional view looking generally in the direction of arrows 5—5 in FIG. 4 and illustrating the intimate heat sinking contact between substantially all tube portions except the high thermally conductive segments 30-33 (see FIG. 3) which are disposed within the relief pockets 50.

FIG. 6 depicts first and second resistive elements 38 and 40 formed on the surface of tubular segments 32 and 33 of sense tube 24. The elements 38-40 are comprised of a thin film of nickel, platinum, or other suitable material with a high temperature coefficient of resistivity, deposited over an insulating layer 60 of polyimide (or alumina or other suitable electrical insulators). Insulating layer 60 is applied by dip-coating (or sputtering or evaporating, etc.) tube 24. The nickel, platinum or other suitable film is then applied upon insulation layer 60 and around tube 24 by sputtering, evaporating or other similar processes. The nickel (or other) layer is patterned into elements 34-40 with each element extending all the way around the outside portion of tube 24. The pattern itself of the nickel layer is not necessarily important except to adjust the individual element's resistance. The pattern that is used in the preferred embodiment is a longitudinal meandering pattern. However, as stated above, the pattern is not necessarily relevant to the performance of the flow meter. It is important to note that almost 50% of the surface of the thin film nickel layer is in intimate engagement with the surface of tube 24, being separated therefrom by only the thin insulating layer 60. Additionally, the thin film elements 34-40 are extremely low in mass which proves to be important in reducing the response time to temperature changes. Furthermore elements 34-40 are easily produced in the same area with a wide range of resistances.

An important aspect of the present invention resides in the makeup of tube 24 on which the thin film element pairs 34-40 are formed. The principal material of tube 24 is 316 stainless steel which has a relatively low thermal conductivity. Low thermal conductivity is required to prevent heat from being transferred from one element of element pair 20 to another by thermal conduction through tube 24. The low thermal conductivity of the tube helps to isolate the temperature effects of each element from the others.

Although conduction along the axis of tube 24 is not desirable, conduction radially through the same at the locations of elements 34–40 is very much desirable in order to track the fluid flow conduction. That is, to sense flow rate changes quickly, rapid heat conduction is desirable from the inside to the outside of the tube. As mentioned above, to provide for good radial conduction and low axial conduction beneath the elements 34–40, the composite tube construction illustrated in FIG. 7 can be utilized wherein short segments 32 and 33 (and 30, 31 of FIG. 3) of nickel or other suitable thermally conductive material are inserted along the length of a 316 stainless steel tubing material 25 to form the composite tube 24. Tube 24 can be formed by fabricating the individual parts and brazing or welding the assembly together.

Figure 8:
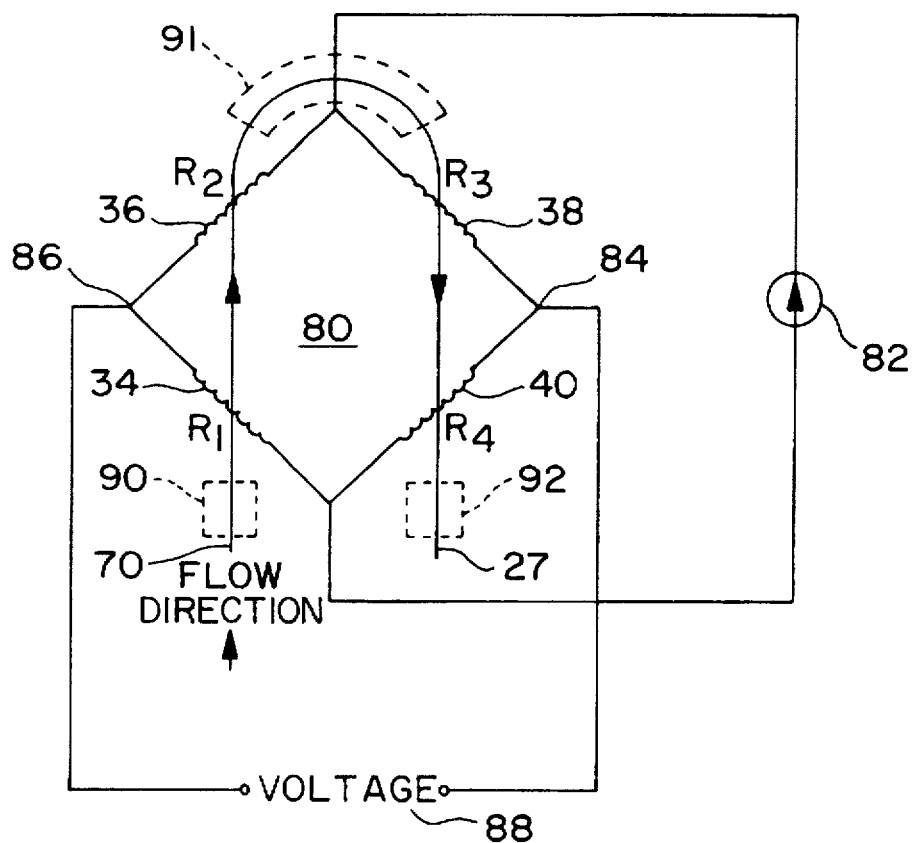
FIG. 8 depicts the bridge circuit employed in the preferred embodiment.

An electrical diagram of a Wheatstone bridge 80 is illustrated in FIG. 8. Each of the four elements 34–40 residing on sensor tube 24 is respectively shown as one of resistors $R_1$, $R_2$, $R_3$ and $R_4$. Constant current is supplied to bridge 80 from a current supply 82. Current supply 82 is connected on one end to resistors $R_2$ and $R_3$ and on the opposite end to resistors $R_1$ and $R_4$. Resistors $R_3$ and $R_4$ are connected to each other at 84 on their respective sides to which there is no current supply connection. Similarly, resistors $R_2$ and $R_1$ are connected to each other at 86 on their respective sides to which there is no current supply connection.

The voltage or potential across bridge terminals 84 and 86 is measured to generate an output signal at 88. Generally, the voltage associated with Wheatstone bridges is represented by the following equation:

$$V = \frac{I}{R_1 + R_2 + R_3 + R_4} (R_1 R_3 - R_2 R_4) \quad (1)$$

If sensor tube 24 is thermally sunk at 90, 91 and 92 to housing 22, and all elements 34–40 are trimmed to match each other closely, Equation (1) can be simplified further to:

$$\Delta V = \frac{I}{2} (\Delta R_{upstream} - \Delta R_{downstream}) \quad (2)$$

As long as all four elements are equal in resistance, and are affected equally by changes in ambient conditions, the bridge will become unbalanced only when flow changes. Ambient conditions are automatically compensated for. This assumption is valid if the effects of the first two resistors on the fluid has died out by the time the fluid reaches the third and fourth resistors.

In operation, a portion of the fluid flow stream through conduit 28 enters the flow meter device shown in FIG. 3 at 70 and is passed into and through sensor tube 24 whereupon it exit at downstream end 27 and reenters conduit 28. Prior to any fluid flow, all resistors are equal and current flow through all elements is equal, there is thus no voltage difference indication at the output 88 of Wheatstone bridge 80 (FIG. 8). Furthermore, during operation and despite any fluid flow, each element pair is self-heated by constant electric current from an external current source as mentioned above. The stabilization temperature of the elements and the time that it takes for the elements to reach steady state are affected by how well the elements are thermally isolated. The external current source 82 providing heat to the elements 34–40 does so by supplying constant current to the elements via the printed circuit board 42 as discussed previously. Lead wires 58, or in the alternative a flexible circuit, are employed to make this connection. Where lead wires are employed for the latter connection, it is important to use lead wires that conduct as little heat away from the elements as possible. This is accomplished by using very small diameter wires having low thermal conductivity, yet good electrical conductivity. To this end, lead wires made of stainless steel or any non-electrical and non-thermally conductive material coated with a good conductor may be employed. Coated wire reduces the mass of the conductive material which, as stated earlier, is desirable and provides a larger, stronger and more manageable conductor. The wire leads 58 are connected to printed circuit board 42 by electrically conductive epoxy, re-flow solder or other suitable means.

As fluid flows through sensor tube 24, heat is transferred to the fluid and the resistances associated with elements 34–40 change and an unbalance develops in Wheatstone bridge 80 (in FIG. 8). So long as all four elements are equal in resistance and are affected equally by changes in ambient conditions, bridge 80 will become unbalanced only when flow changes. Accordingly, ambient conditions are automatically compensated for.

It will be appreciated that to achieve repeatable and stable elements that are trimmed to match, sensor housing 22 must be made of consistent material. Accordingly, fiber or foam type insulation is not acceptable because even a minor change in composition or placement of insulation can alter the steady state temperature of an individual element and thus affect the matching of resistance of the four elements.

To accomplish element pair independence, sensor tube 24 should be thermally sunk to sensor housing 22, except for the areas where elements 34–40 are located. Sinking of the tube to the housing as indicated at 91 in FIG. 8 allows the fluid temperature to return to ambient temperature after passing through the first set of elements. The gas then enters the second pair of elements at the same temperature at which it entered the first pair. The second pair then behaves exactly the same as the first pair. To prevent hot spots which can locally affect the elements, sensor housing 22 should be made from a highly thermally conductive material. Furthermore, housing 22 should be massive enough and conductive enough to maintain all points in the housing at the same temperature. This causes ambient temperature changes to affect each element in the same way. To meet these requirements, sensor housing 22 is machined from aluminum or is first cast and then machined.

As shown in FIG. 3, the housing structure is formed of two halves or parts 44 and 46 which "clam-shell" to enclose sensor tube 24. The housing channels in which tube 24 lies is machined to exact specifications for maximum repeatability and optimum thermal conditions. When assembled, both housing halves 44 and 46 are in contact with tube 24 at all points along its length except at the relief pockets 50, the locations of elements 34–40. The pockets 50 are machined so that a thin annular air filled chamber surrounds the elements. Because of the small volume of air in these sockets, free convection is limited. Heat transfer from pockets 50 is very consistent, as is the heat transfer from elements tube 24 to sensor housing 22. In this way, the undesirable effects of insulation are eliminated, and thermal isolation of the elements and free convection caused attitude errors are improved. Improved thermal isolation translates into enhanced response and increased efficiency, i.e. more output signal for a given operating power.

Figure 9:
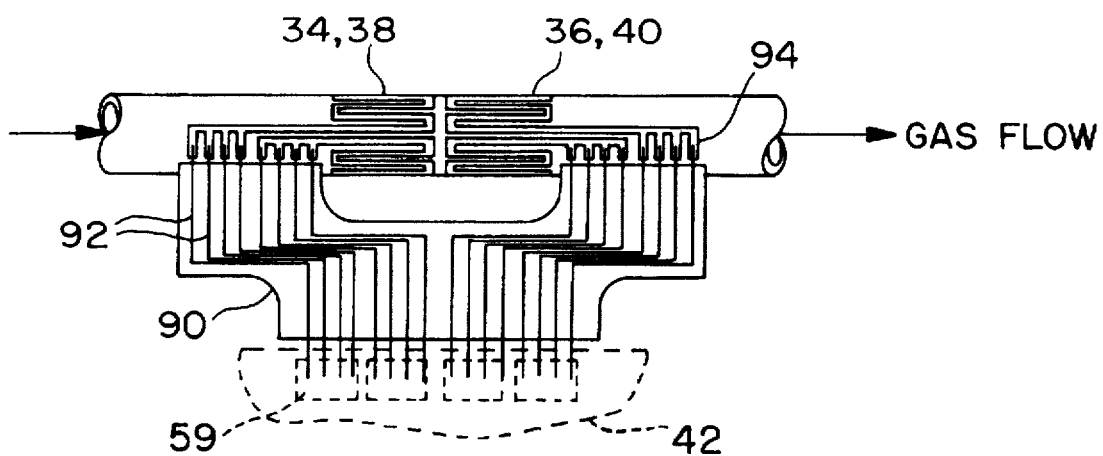
FIG. 9 depicts a top view of the preferred embodiment's resistor pair with a flex circuit connected to the element pair.

As suggested above, a flexible circuit 90 can be substituted for the wire leads 58 in FIG. 3 as shown in FIG. 9 such that circuit traces 92 of the flexible circuit connect the thin film elements 34–40 to PC board 42. In this embodiment multiple contact pads 94 are provided on the elements 34–40 for selective engagement by one or more of the traces 92. This feature allows selection and trimming of the resistive elements at assembly and provides the ability to match pairs and balance the bridge at no flow. The bridge then compensates for changes in ambient temperatures.

Sensor tube 24 can be configured in any of a number of shapes. As described above, the preferred embodiment is the inverted "U" tube design shown in FIG. 3. However, other configurations such as a straight tube can also be employed equally well with a corresponding housing. Furthermore, rather than a four active element bridge, two 2-active element bridges can be formed for a redundancy of measurement. Moreover, multiple elements can be used to form one or more bridges with any number of active elements. This manufacturing technique allows multiple elements of varying size to be placed on the tube with little cost impact.

While the invention has been particularly shown and described with reference to a certain preferred embodiment, it will be understood by those skilled in the art that various alterations and modifications in form and detail may be made therein. Accordingly, it is intended that the following claims cover all such alterations and modifications as fall within the true spirit and scope of the invention.

What is claimed is:

1. A thermal mass flow meter for measuring fluid flow rate comprising:
   a housing;
   a composite sensor tube of a first material having a first thermal conductivity and including segments of a second material having a second thermal conductivity greater than said first conductivity, the tube and segments being attached together for conducting fluid the mass flow rate of which is to be measured, and having at least two resistive thin film elements formed on said segments of said second material, said sensor tube being thermally sunk to said housing in substantially all surface areas except those upon which the elements are located, the elements having means for allowing selection and trimming of resistance associated therewith during assembly of the thermal mass flow meter;
   a source providing constant current; and
   electrical means for coupling constant current from said source to said elements and for measuring voltage change across said elements, the voltage change being representative of temperature change in the elements and proportional to the fluid mass flow rate.

2. A thermal mass flow meter as recited in claim 1 wherein each of said elements are formed of a nickel layer deposited over a layer of electrical insulating material formed on said tube.

3. A thermal mass flow meter as recited in claim 1 wherein at least a portion of said tube is formed 316 stainless steel material.

4. A thermal mass flow meter as recited in claim 1 wherein said second material is comprised of nickel and said first material is comprised of 316 stainless steel, and wherein said tube and said segments are attached together by a method selected from the group consisting of welding and brazing.

5. A thermal mass flow meter as recited in claim 1 wherein said electrical means is coupled to said elements via a flexible circuit.

6. A thermal mass flow meter as recited in claim 1 wherein said electrical means is coupled to said elements via a plurality of wire leads.

7. A thermal mass flow meter as recited in claim 6 wherein said wire leads are formed from non-electrical and non-thermally conductive material coated with a conductive material.

8. A thermal mass flow meter as recited in claim 5 wherein said flexible circuit is connected to said electrical means by electrically conductive epoxy.

9. A thermal mass flow meter as recited in claim 6 wherein said wire leads are connected to said electrical means by electrically conductive epoxy.

10. A thermal mass flow meter as recited in claim 5 wherein said flexible circuit is connected to said elements by reflow solder.

11. A thermal mass flow meter as recited in claim 6 wherein said wire leads are connected to said elements by reflow solder.

12. A thermal mass flow meter as recited in claim 1 wherein said housing is thermally conductive and of a mass sufficient to maintain all said thermally sunk surface areas of said tube at substantially the same temperature.

13. A thermal mass flow meter as recited in claim 1 wherein said housing is formed from aluminum material.

14. A thermal mass flow meter as recited in claim 1 wherein said housing is shaped to form a thin annualar air filled chamber enclosing said elements.

15. A thermal mass flow meter as recited in claim 1 wherein said electrical means includes a four active elements bridge.

16. A thermal mass flow meter as recited in claim 1 wherein said electrical means includes a two 2-active elements bridge.

17. A thermal mass flow meter as recited in claim 1 wherein said tube is generally in the form of an inverted "U" shape.

18. A thermal mass flow meter as recited in claim 1 wherein said tube is an elongated, generally straight tube.

19. A thermal mass flow meter as recited in claim 1 wherein said housing includes at least two mating pieces with at least one of said pieces having a groove formed therein for receiving substantially all of the length of said tube except that carrying said elements.

20. A thermal mass flow meter as recited in claim 1 wherein said thin film elements are formed using nickel layer wiring photolithography techniques.

21. A method of measuring mass flow rate using a thermal mass flow meter comprising;
   providing a housing;
   providing a composite sensor tube of a first material having a first thermal conductivity and including segments of a second material having a second thermal conductivity greater than said first conductivity the tube and segments being attached together and having at least two resistive thin film elements formed on said segments of said second material, said sensor tube being enclosed within said housing and being sunk to said housing in substantially all areas except where said elements are located;
   providing a source for applying a constant electrical current flow through at least one said elements;
   passing a fluid through said sensor tube;
   during the application of said constant current flow, measuring a voltage change across said elements representative of temperature change in said elements; and
   using the measured voltage change as an indication of the fluid mass flow rate through said sensor tube.

22. A method of measuring mass flow rate as recited in claim 21, wherein each of said elements has multiple segments for allowing selection and trimming of resistance associated with said elements during assembly of the thermal mass flow meter.

23. A method of measuring mass flow rate as recited in claim 21, wherein said housing is thermally conductive to maintain all points in the housing at the same temperature.

24. A method of measuring mass flow rate as recited in claim 21 wherein said thin film elements are formed by depositing a nickel layer over portions of the length of said tube and using a photo lithographic technique to define the boundaries of said elements.

* * * * *